United States Patent [19]

Fieseler et al.

[11] Patent Number: 4,938,376
[45] Date of Patent: Jul. 3, 1990

[54] VALVE FOR SAFEGUARDING THE OUTER CONTAINER OF DOUBLE WALL VACUUM-INSULATED STORAGE CONTAINERS FOR LOW BOILING LIQUIFIED GASES

[75] Inventors: Heinrich Fieseler, Dormagen; Roland Henneborn; Gunter Holstein, both of Cologne, all of Fed. Rep. of Germany

[73] Assignee: Messer Griesheim GmbH, Fed. Rep. of Germany

[21] Appl. No.: 228,054

[22] Filed: Aug. 4, 1988

[30] Foreign Application Priority Data

Aug. 21, 1987 [DE] Fed. Rep. of Germany ....... 3727891

[51] Int. Cl.⁵ .............................................. B65D 51/16
[52] U.S. Cl. ..................................... 220/203; 220/209; 251/332; 251/900
[58] Field of Search ..................... 220/203, 208, 209; 137/533, 516.29; 251/900, 332, 358

[56] References Cited

U.S. PATENT DOCUMENTS

| | | | |
|---|---|---|---|
| 1,375,497 | 4/1921 | Eickman | 137/533 X |
| 2,537,249 | 1/1951 | Walton | 251/900 X |
| 2,599,622 | 6/1952 | Folmsbee | 251/900 X |
| 2,910,267 | 10/1959 | Holby | 251/332 |
| 3,202,178 | 8/1965 | Wolfe | 251/900 X |
| 3,256,117 | 6/1966 | Howatt et al. | 220/209 X |
| 3,497,395 | 2/1970 | Kohen | 220/203 X |
| 4,484,888 | 11/1984 | Grosslord et al. | 251/900 X |

FOREIGN PATENT DOCUMENTS

| | | | |
|---|---|---|---|
| 290499 | 3/1962 | Netherlands | 251/332 |
| 1331324 | 9/1973 | United Kingdom | 220/203 |

*Primary Examiner*—Stephen Marcus
*Assistant Examiner*—C. A. Peterson
*Attorney, Agent, or Firm*—Connolly & Hutz

[57] ABSTRACT

A valve for safeguarding the outer container of a double wall vacuum-insulated container for low boiling liquified gases against a pressure increase in the insulation space after a loss of vacuum comprises a valve housing fastened in the outer container, a valve plug and an O-ring which, as a result of deformation, act as a sealing element between the valve housing and the valve plug. The dimensions of the valve housing and seal plug causing deformation of the O-ring in the radial direction and the influence of the outside air pressure causing simultaneous deformation in the axial direction.

6 Claims, 1 Drawing Sheet

VALVE FOR SAFEGUARDING THE OUTER CONTAINER OF DOUBLE WALL VACUUM-INSULATED STORAGE CONTAINERS FOR LOW BOILING LIQUIFIED GASES

BACKGROUND OF INVENTION

Loss of vacuum may occur suddenly as a result of a mechanical effect in an accident. This happens infrequently and is not considered but rather the much more often occurring cases in which air, through very minute leaks, very gradually enters the evacuated insulation space where it cools off. The loss of vacuum goes hand in hand with a higher heat influx so that the stored liquified gas rapidly evaporates.

As soon as all the liquid gas has evaporated, the container as well as the air which has entered the insulation space heats up. Since the air cannot escape fast enough through the small leak, an overpressure is produced which damages or destroys the container.

In order to prevent this type of damage, relatively simply constructed safety valves have been installed on the outer container. These valves essentially consist of a cylindrical valve housing and an equally cylindrical valve plug. The sealing was achieved by a radial squeezing of an O-ring between the valve housing and the valve plug. These valves were, however, not satisfactory. A certain compressive force on the sealing faces is namely required to guarantee the seal. The response pressure of the valve is higher than this compressive force but should not be too high since otherwise the function as safety valve is impaired or lost. The given response pressure is, however, almost always exceeded since the squeezing of the O-ring produces excessive friction forces on the slide faces. The reasons are fabrication tolerances, different surface condition, environmental influences and, in particular, the high coefficient of adhesion. Cases of damage, therefore, occurred attributed to the failure of this valve to function. Either the valve did then not open at all or only at an unacceptably high pressure.

These problems occur especially when small containers, pipe lines and other small vacuum spaces have to be safeguarded. In large containers, for example, vertical tanks, the safety valves have such a large diameter that the outside air pressure already provides a sufficient compressive force for the sealing element.

SUMMARY OF INVENTION

The invention is based on the object of providing a safeguard for an outer container which guarantees a constant response behavior at overpressure in the insulation space and is particularly suitable for small containers.

The radial as well as the axial deformation of the O-ring is the essential characteristic of the valve according to the invention. The deformation in radial direction is then kept so low that the required response pressure is definitely guaranteed. The sealing force in radial direction, on the other hand, is sufficient to omit the action of an additional spring force in axial direction. The deformation in axial direction is, therefore, exclusively caused by the pressure difference between the vacuum in the insulation space and the surrounding air.

While the O-ring in the previously used, only radially sealing, valves was squeezed up to the deformation limit, the radial degree of deformation for the valve according to the invention stays very small. Compared to the known installation specifications which provide for about 20% deformation for static sealing and for about 10% for dynamic sealing, the deformation tolerance, while considering all maximum allowable tolerances, is within the limits ranging from 5 to 10%.

When used as safety valve, therefore, in spite of possible processing tolerances, a low spread in the response range is, therefore, obtained. This is lower than for the rupture discs also used for this purpose. The response pressures measured in a test series after an artificial aging were found at about 0.3 bar with a deviation of ±0.1 bar. This behavior is attained by a targeted utilization of the elasticity of the axially compressed O-ring. The permanent axial force on the O-ring determines an axial deformation and resulting elastic deformation. The attainable degrees of deformation in axial direction are found at about 10% and are determined by the dimensions, the pressure ratios and the material for the O-ring.

If, after a vacuum loss, the pressure equalizes and the pressure in the insulation space subsequently increases, the O-ring returns again to its original state. The radial compression at the cylindrical slide faces of the valve housing then diminishes and also the normal force responsible for a high static friction. At the same time, the force left over by the axial deformation is released of which the effective direction is equal to the compressive force acting on the face of the valve as a result of increasing pressure in the inner container. This produces an immediate change from static to sliding friction.

THE DRAWINGS

DETAILED DESCRIPTION

Figure 1:
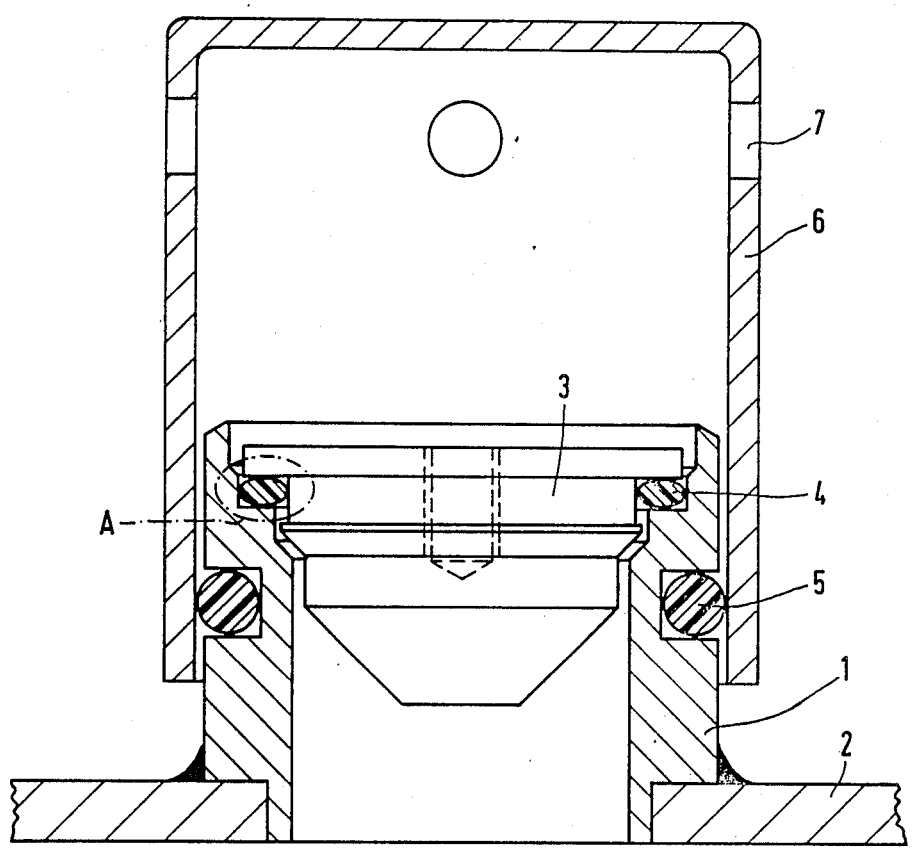
FIG. 1 shows a cross section of a valve according to the invention installed in an outer container.

The valve shown in FIG. 1 consists of the valve housing 1 which is welded to an outer container 2. In the valve housing 1, the valve plug 3 is found and in-between the O-ring 4 acting as sealing element as a result of deformation. On the valve housing 1, a valve protecting cap 6 with blow-off openings 7 is placed by means of another O-ring 5. This valve protecting cap 6 has no significance for the functioning of the valve described in FIGS. 2 and 3. The valve plug 3 has a threaded bore for lifting the threaded plug when a vacuum lock is applied.

Figure 2:
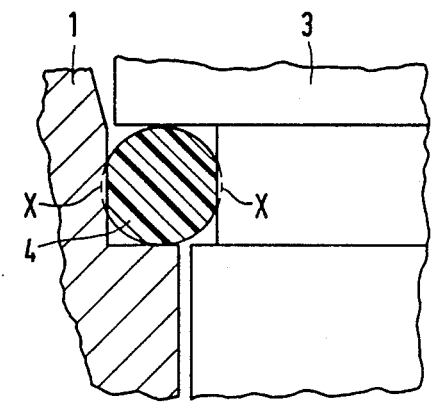
FIG. 2 shows the detail A of FIG. 1 before the vacuum is produced.

FIG. 2 shows the valve in the state of equalized pressure between insulation space and outside atmosphere. This state prevails before the insulation space is evacuated and also after the insulation space has been evacuated as long as the vacuum lock is connected to the valve. Only a radial deformation at points X then takes place determined by the dimensions of valve housing 1 and valve plug 3. In this state, this radial deformation, preferably, ranges from 5 to 10%.

Figure 3:
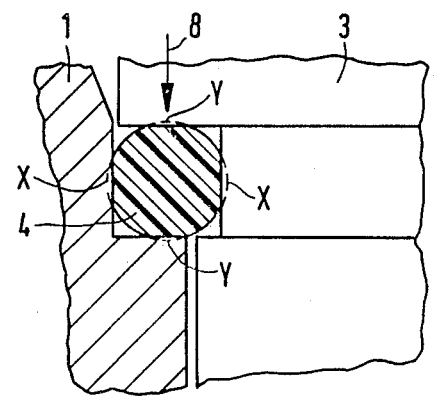
FIG. 3 shows the detail A of FIG. 1 after the vacuum is produced in the insulation space.

FIG. 3 shows the state of the valve after removal of the vacuum pump hose, in other words, in normal use. The pressure difference between the evacuated insulation space and the outside atmosphere produces a force in axial direction on the valve plug 3 shown by the arrow 8. This force causes an additional deformation of the O-ring at points Y. As a result, however, also the radial deformation at points X is increased. The force 8, therefore, results in a better sealing of the entire system. The degree of deformation in this stationary state corresponds to the degree of deformation of a static seal.

When a sudden pressure increase in the insulation space occurs, the O-ring 4 in axial direction returns extensively to its original shape so that the forces acting at points X become lower and the radial deformation diminishes. Likewise, the normal force against the slide surfaces of the valve responsible for the magnitude of the frictional force diminishes. When the inside pressure continues to increase, the valve opens as soon as the present response pressure has been reached.

If, up to the pressure equalization, the return deformation of the O-ring 4 should not take place, in other words, there is a high static friction caused by aging, the increasing pressure in the insulations pace now assists the force of the O-ring 4 acting against the static friction. The prestress force and the compressive force on the cross sectional face of the valve accumulate so that, in a very limited pressure range, the static friction is overcome which is connected with a spontaneous change to slide friction and an immediate opening of the valve.

What is claimed is:

1. A method of safeguarding the outer container of double wall vacuum-insulated storage containers for low boiling liquified gases against a pressure increase in the insulation space after a loss of vacuum by means of a valve comprising a valve housing fastened in the outer container and a valve plug and an O-ring which as a result of deformation act as a sealing element between the valve housing and the valve plug, the improvement being in deforming the O-ring in its radial direction as a result of the dimensions of the valve housing and the seal plug and simultaneously deforming the O-ring in its axial direction as a result of the influence of the outside air pressure on the valve plug.

2. The method of claim 1 characterized in deforming the O-ring from 5 to 10% in its radial direction and from 8 to 12% in its axial direction.

3. Valve to secure the outer tank of double-walled vacuum-insulated storage tanks for low-boiling liquefied gases against a rise in pressure in the insulation space if the vacuum is interrupted, by means of a valve housing attached in the outer tank, a valve plug arranged in the valve housing and forming an annular gap, and an O-ring provided as a sealing element in the annular gap, whose thickness, in order to achieve a deformation in the radial direction, is greater than the width of the annular gap, the improvement being in that the width of the annular gap which leads to a deformation of the O-ring in the radial direction of essentially less than 20%, as well as by means of circular sealing surfaces which engage with the O-ring and which are on the valve housing and valve plug, with which an axial deformation of the O-ring can be induced by the external air pressure.

4. Valve according to claim 3, characterized by a width of the annular gap which leads to a radial deformation of the O-ring being between 5% and 10%.

5. Valve according to claim 4, characterized in that the dimensions and the material of the O-ring allow an axial deformation by the external air pressure after generation of the vacuum between 8% and 12%.

6. Valve according to claim 3, characterized in that the dimensions and the material of the O-ring allow an axial deformation by the external air pressure after generation of the vacuum between 8% and 12%.

* * * * *